(12) United States Patent
Bogachuk et al.

(10) Patent No.: US 9,505,439 B2
(45) Date of Patent: Nov. 29, 2016

(54) VARIABLE WIDTH PLATFORM VEHICLE BODY STRUCTURE AND METHOD

(71) Applicant: FORD GLOBAL TECHNOLOGIES, LLC, Dearborn, MI (US)

(72) Inventors: Vladimir Vladimirovich Bogachuk, West Bloomfield, MI (US); Monica Blair, Ann Arbor, MI (US); Maria J. Heirtzler, Northville, MI (US); Shawn Michael Morgans, Chelsea, MI (US); Steve William Gallagher, Bloomfield Hills, MI (US); Joshua Jacob Clement, Dearborn, MI (US); Eric Layton Stratten, Plymouth, MI (US); Jon A. Wilcox, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 30 days.

(21) Appl. No.: 14/686,917

(22) Filed: Apr. 15, 2015

(65) Prior Publication Data
US 2016/0304128 A1 Oct. 20, 2016

(51) Int. Cl.
| B62D 21/16 | (2006.01) |
| B62D 25/02 | (2006.01) |
| B62D 65/00 | (2006.01) |
| B62D 21/14 | (2006.01) |
| B62D 25/20 | (2006.01) |

(52) U.S. Cl.
CPC ............ *B62D 21/14* (2013.01); *B62D 25/025* (2013.01); *B62D 65/00* (2013.01); *B62D 25/02* (2013.01); *B62D 25/2036* (2013.01)

(58) Field of Classification Search
CPC B62D 25/02; B62D 25/025; B62D 25/2036; B62D 21/16; B62D 65/00

USPC ................ 296/193.04, 203.02, 209
See application file for complete search history.

(56) References Cited

U.S. PATENT DOCUMENTS

| 4,342,146 | A | * | 8/1982 | Hanson | ...................... | B60P 3/32 180/89.1 |
| 4,730,870 | A | * | 3/1988 | DeRees | ................. | B62D 65/04 296/192 |
| 4,865,378 | A | * | 9/1989 | Filtri | ...................... | B62D 21/14 29/401.1 |
| 5,388,885 | A | * | 2/1995 | Warren | ................. | B62D 21/14 296/203.03 |
| 5,549,352 | A | | 8/1996 | Janotik et al. | | |

(Continued)

FOREIGN PATENT DOCUMENTS

| JP | H06206580 A | 7/1994 |
| JP | 2004249786 A | 9/2004 |

*Primary Examiner* — Gregory Blankenship
(74) *Attorney, Agent, or Firm* — Jason C. Rogers; Brooks Kushman P.C.

(57) ABSTRACT

A method of varying vehicle width on a single platform includes providing a plurality of vehicles, where each vehicle includes a side sill extending longitudinally along a lower portion of a vehicle body. The side sill defines a door opening interface on each opposing side of the vehicle body. Each of the plurality of vehicles also includes a floor panel extending laterally across a width of each vehicle. The floor panel is joined at a lateral edge to the side sill. The method also includes maintaining a common lateral position of the joint between the floor panel and the side sill across each of the plurality of vehicles. The method further includes positioning the door opening interface at first lateral position corresponding to a first one of the plurality of vehicles and at a second lateral position corresponding to a second one of the plurality of vehicles.

12 Claims, 3 Drawing Sheets

(56) References Cited

U.S. PATENT DOCUMENTS

| | | | | |
|---|---|---|---|---|
| 5,849,122 | A | * | 12/1998 | Kenmochi .......... B60R 13/0815 156/182 |
| 6,334,252 | B1 | * | 1/2002 | Sato ................... B23K 26/0838 29/430 |
| 7,269,900 | B2 | * | 9/2007 | Moriya ................ B23P 21/004 209/44.4 |
| 8,276,982 | B2 | * | 10/2012 | Favaretto ............... B62D 21/12 296/193.04 |
| 8,668,253 | B2 | | 3/2014 | Bauer |
| 8,926,006 | B2 | * | 1/2015 | Mildner ............. B62D 25/2009 296/193.07 |
| 2012/0139292 | A1 | * | 6/2012 | Hofer ................... B62D 63/025 296/181.1 |
| 2013/0099526 | A1 | * | 4/2013 | Mildner ............... B62D 63/025 296/193.07 |
| 2013/0264840 | A1 | * | 10/2013 | Izumi ................... B62D 25/025 296/187.12 |
| 2014/0008897 | A1 | * | 1/2014 | Tsukerman ............ B62D 21/14 280/657 |

* cited by examiner

VARIABLE WIDTH PLATFORM VEHICLE BODY STRUCTURE AND METHOD

TECHNICAL FIELD

The present disclosure relates to vehicle body structures and methods of constructing vehicle body structures.

BACKGROUND

Vehicles having different lateral widths may provide a range of performance attributes and customer interfaces. For example, interior roominess of the passenger compartment is often directly related to the external lateral width of the vehicle. Also, vehicle weight may be affected by the package efficiency or maximization of interior roominess relative to exterior width. Inefficient packaging of structures may reduce the lateral roominess of the passenger compartment for a given vehicle width, and unnecessarily add mass.

Constructing different vehicles having unique components and configurations increases manufacturing complexity. Vehicle manufacturers endeavor to produce a wide array of vehicles providing a range of different aesthetics and sizes. Increasing unique components across different vehicles increases tooling costs and ongoing manufacturing costs related to the complexity.

This disclosure is directed to solving the above problems and other problems as summarized below.

SUMMARY

In at least one embodiment, a method of varying vehicle width on a single platform includes providing a plurality of vehicles, where each includes a side sill extending longitudinally along a lower portion of the vehicle body. The side sill defines a door opening interface on each opposing side of the vehicle body. Each of the plurality of vehicles also includes a floor panel extending laterally across a width of each vehicle. The floor panel is joined at a lateral edge to the side sill. The method also includes maintaining a common lateral position of the joint between the floor panel and the side sill across each of the plurality of vehicles. The method further includes positioning the door opening interface at first lateral position corresponding to a first one of the plurality of vehicles and at a second lateral position corresponding to a second one of the plurality of vehicles.

In at least one embodiment, a vehicle includes a floor panel spanning across a width of the vehicle and a sill inner panel joined to the floor panel. The sill inner panel defines a first riser connected to the floor panel, and a first shelf extending laterally from the first riser. The sill inner panel also defines a second riser extending from the first shelf, and a second shelf extending laterally from the second riser. The sill inner panel further defines a vertical flange extending from the second shelf. The vehicle also includes a sill outer panel joined to the vertical flange and forming a closed section to the sill inner panel—this closed section could be formed by extrusion, tubular forming, or any other method that achieves a closed section. The floor panel is set for use across multiple vehicles of a platform, and the size of the first shelf of the sill inner panel is varied to accommodate different vehicles having unique lateral widths.

In at least one embodiment, a method of constructing a vehicle body structure includes providing a floor panel spanning laterally across a vehicle. The method also includes selecting a first side sill structure corresponding to a first vehicle width in response to a request for a wide vehicle. The method further includes selecting a second side sill structure corresponding to a second vehicle width in response to a request for a narrow vehicle. The method further includes joining the selected one of the first side sill structure or the second side sill structure to a lateral edge of the floor panel.

The above aspects of this disclosure and other aspects are described below in greater detail with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Vehicle manufacturers often design and manufacture different vehicles across a range of sizes and different exterior shapes. Each of the differently sized vehicles may be targeted for different potential customers and have unique interior roominess targets for the interior passenger compartment. To this end, different structural configurations for each vehicle body can lead to increased manufacturing complexity and costs.

Figure 1:
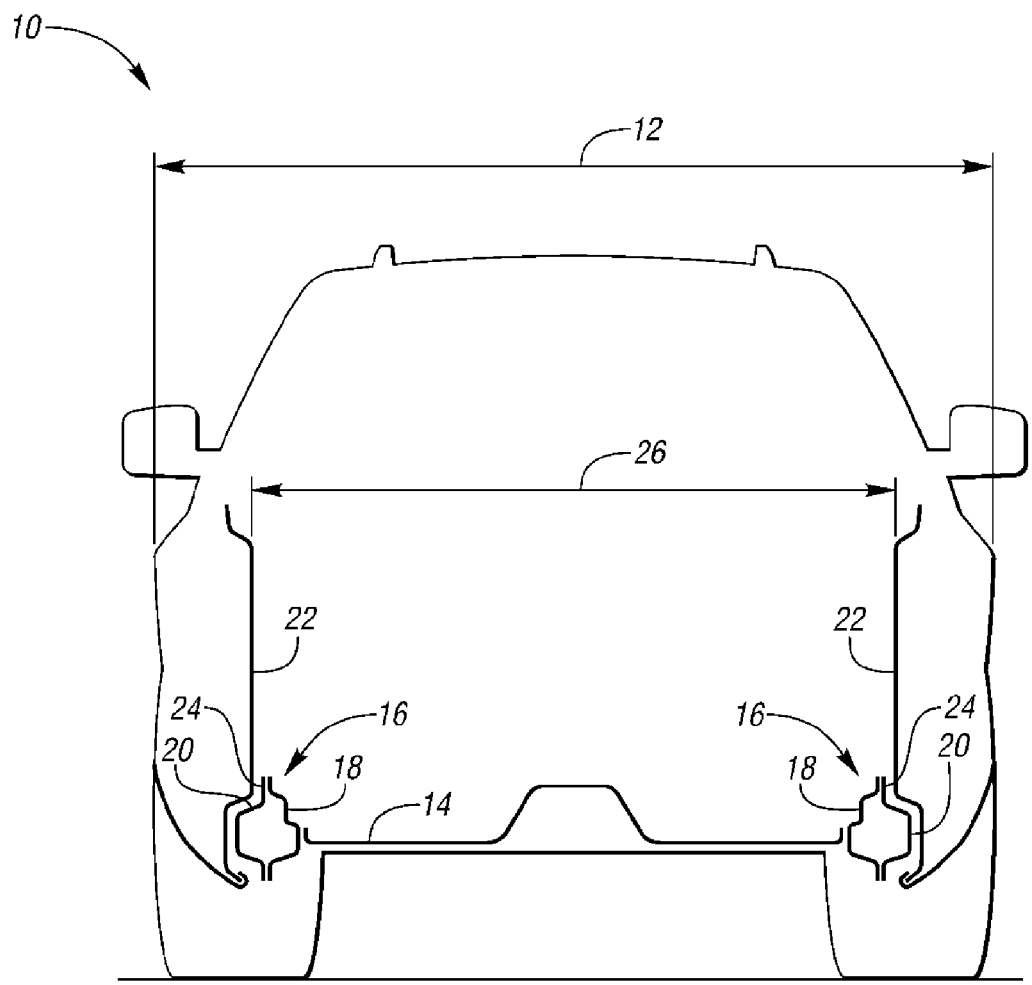
FIG. 1 is a schematic front view cross-section of a vehicle body structure.

FIG. 1 is a schematic cross-section of a vehicle 10 defining an external lateral width 12. The vehicle 10 includes a floor panel 14 that spans across the width of the vehicle 10 and is joined to a side sill structure 16 at opposing lateral edges. Each of the side sill structures 16 defines a closed cross-section extending longitudinally along the fore-aft length of the vehicle 10. In some embodiments, this closed cross-section could be formed by extrusion, tubular forming, or any other method that achieves a closed section.

The side sill structures include an inner sill panel 18 that is joined to the floor panel, and an outer sill panel 20 that defines an interface to a side door 22. The inner sill panel 18 is joined to the outer sill panel 20 at a vertical flange 24. The position of the side door 22 is set relative to the lateral position of the vertical flange 24 according to a predetermined distance generally driven by a desired sealing gap. An inner portion of each opposing side door 22 may define an interior lateral width 26 of a passenger compartment. It desirable to maximize the interior lateral width 26 relative to the external lateral width 12 to reduce vehicle weight and optimize interior roominess within the available vehicle package.

Differently sized vehicles may cause a number of unique components in the lower vehicle body structure. For example, laterally indexing the entire side sill section outboard to compensate for larger vehicles may drive the need for wider floor panels, front dash panels, and other unique underbody components corresponding to each individual vehicle width. It may be desirable to manufacture several differently-sized vehicles within the same facility. However, a large number of unique components not only increases tooling costs, but also increases assembly complexity which carries ongoing manufacturing costs. Additionally, it may be desirable to maximize reuse of lower vehicle body components across several different vehicles or vehicle lines to reduce costs and standardize designs.

Figure 2:
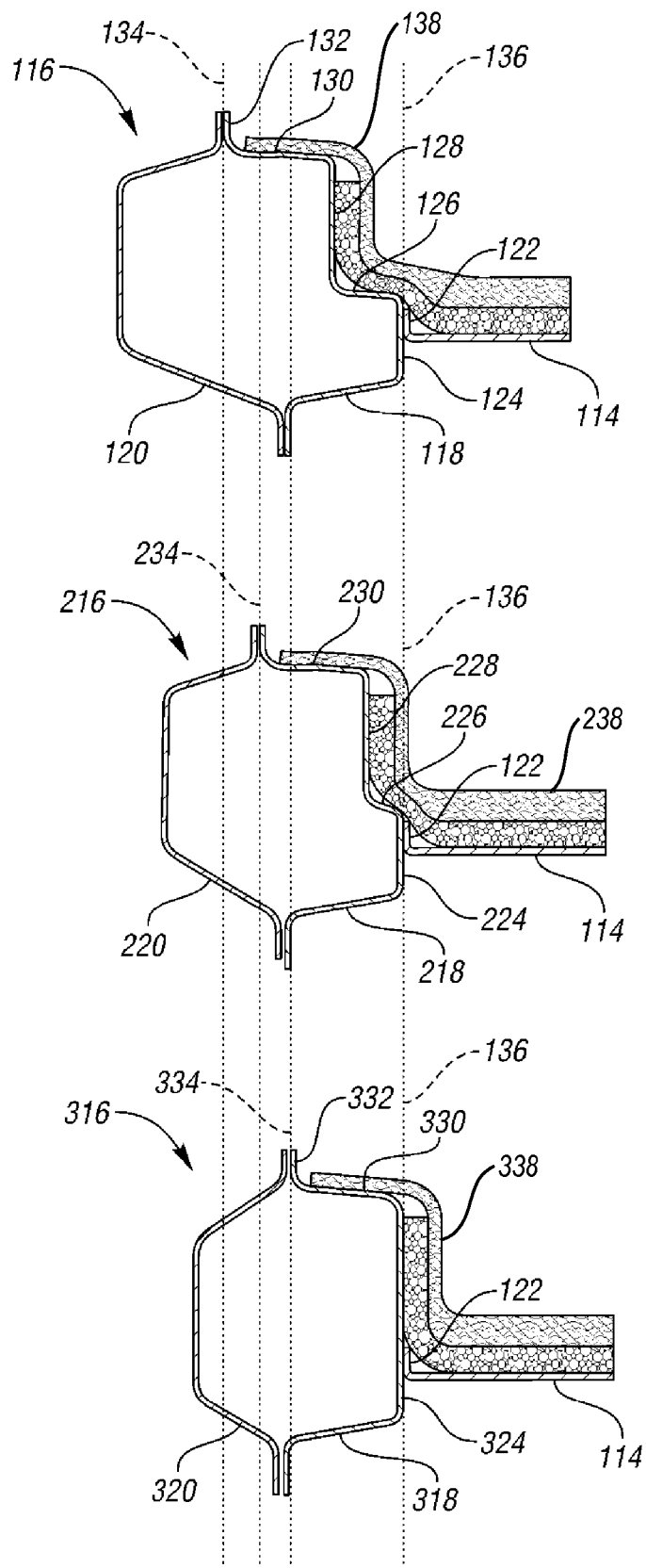
FIG. 2A is a cross-section of a lower side sill structure corresponding to a wide width vehicle.
FIG. 2B is a cross-section of a lower side sill structure corresponding to a medium width vehicle.
FIG. 2C is a cross-section of a lower side sill structure corresponding to a narrow width vehicle.

FIGS. 2A through 2C are a series of cross-sections of a floor panel interface to sill inner panel, where each of the figures corresponds to a vehicle having a different width with respect to the other figures. The terms "wide" and "narrow" are used herein not as absolutes, but to represent different widths within a maximum available range of widths available for a given vehicle platform.

FIG. 2A corresponds to a vehicle having a wide width. In at least one embodiment the wide width vehicle may correspond to a full-size sport utility vehicle, or SUV. Floor panel 114 is joined to a side sill inner panel 118. The floor panel 114 includes an upright flange 122 that is joined to a first riser 124 of the side sill inner panel 118. In at least one embodiment, the upright flange 122 of the floor panel is spot welded to the first riser 124. Other joining methods may also be suitable to attach the floor panel 114 to the side sill structure 116. For example, seam welding, riveting, bonding or a combination of different joining methods may also be suitable. A first shelf 126 extends laterally from the first riser 124. A second riser 128 extends vertically from the first shelf 126. A second shelf 130 extends laterally form the second riser 128. A vertical flange 132 extends from the second shelf 130. The vertical flange 132 is joined to the side sill outer panel 120. The combination of the side sill outer panel 120 and the side sill inner panel 118 forms a closed cross-section of the side sill structure 116 that extends longitudinally along a lower portion of the wide width vehicle body structure. An interior trim component 138 covers the floor panel 114 and inner sill panel 118 from customer view.

As discussed above, the side sill outer panel 120 interfaces with a door structure by virtue of a predetermined seal gap. The shape of the side sill outer panel 120 corresponds to the shape of the inner portion of the side doors. The lateral position 134 of the vertical flange may set up the position of the door and corresponds to the particular vehicle width. In at least one embodiment, the lateral dimension of the first shelf 126 is sized corresponding to the overall width of the vehicle. In this way, a common lateral position of the joint between the floor panel 114 and the side sill inner panel 118 is maintained across each of a plurality of vehicles having different overall widths. In the example of FIG. 2A the lateral position of the joint between the floor panel 114 and the side sill inner panel 118 is indicated by dotted line 136.

Referring to FIG. 2B, a second side sill structure 216 is depicted that corresponds to a vehicle having medium width. In at least one embodiment, the medium width vehicle may correspond to a "crossover" or mid-sized utility vehicle that is narrower than a full-size SUV. Floor panel 114 is joined to a side sill inner panel 218. The upright flange 122 of floor panel 114 is joined to a first riser 224 of the side sill inner panel 218. A first shelf 226 extends laterally from the first riser 224. A second riser 228 extends vertically from the first shelf 226. A second shelf 230 extends laterally form the second riser 228. A vertical flange 232 extends from the second shelf 230. The vertical flange 232 is joined to the side sill outer panel 220. The combination of the side sill outer panel 220 and the side sill inner panel 218 forms a closed cross-section of the side sill structure 216 that extends longitudinally along a lower portion of the medium width vehicle body structure. An interior trim component 238 covers the floor panel 114 and inner sill panel 218 from customer view.

The joint between the floor panel 114 and the side sill inner panel 218 shown in 2B is in a lateral position 136 that is common to the wide vehicle depicted in FIG. 2A. This configuration allows substantially all of the lower body structure components that are inboard of the upright flange 122 to be used for both the wide vehicle depicted in FIG. 2A, as well as the medium vehicle depicted in FIG. 2B. The first shelf 226 is sized according to the medium width vehicle that is narrower than the wide vehicle corresponding to the structure depicted in FIG. 2A. One aspect of the adjustment depicted in FIG. 2B is that the joint between the side sill inner panel 218 and the side sill outer panel 220 is shifted inboard to accommodate the medium width vehicle. In the example shown in 2B the lateral position of the joint between the side sill inner panel 218 and the side sill outer panel 220 is indicated by dotted line 234. In at least one embodiment the lateral position 234 of the joint between the side sill inner panel 218 and the side sill outer panel 220 is shifted inboard by about 20 mm to accommodate a vehicle that is approximately 40 mm narrower than the wide vehicle of FIG. 2A while utilizing the same floor panel 114. It should be appreciated that a range of different vehicle widths may be accommodated by different sizing of the first shelf 226.

Referring to FIG. 2C, a third side sill structure 316 is depicted that corresponds to a vehicle having narrow width. In at least one embodiment, the narrow vehicle may correspond to a passenger sedan. Floor panel 114 is joined to a side sill inner panel 318. The upright flange 122 of floor panel 114 is joined to a first riser 324 of the side sill inner panel 318. A shelf 330 extends laterally from the first riser 324. In the case of the narrow vehicle of FIG. 2C the intermediate lateral shelf between the top and bottom of the side sill inner panel may be minimized or eliminated. FIG. 2C depicts an embodiment where the absence of an intermediate lateral step provides for adjustment to accommodate a vehicle having a narrow width. A vertical flange 332 extends from the shelf 330. The vertical flange 332 is joined to the side sill outer panel 320. The combination of the side sill outer panel 320 and the side sill inner panel 318 forms a closed cross-section of the side sill structure 316 that extends longitudinally along a lower portion of the narrow vehicle body structure. An interior trim component 338 covers the floor panel 114 and inner sill panel 318 from customer view.

The joint between the floor panel 114 and the side sill inner panel 318 shown in 2C is in a lateral position 136 that is common to the wide vehicle depicted in FIG. 2A, as well as the medium width vehicle depicted in FIG. 2B. As described above, the intermediate lateral shelf of the side sill inner panel is eliminated to accommodate the vehicle corresponding to FIG. 2C, which is narrower than both the wide vehicle corresponding to the structure depicted in FIG. 2A, as well as the medium width vehicle of FIG. 2B. As depicted in FIG. 2C, the joint between the side sill inner panel 318 and the side sill outer panel 320 is shifted inboard to accommodate the narrow width vehicle. In the example shown in 2C the lateral position of the joint between the side sill inner panel 318 and the side sill outer panel 320 is indicated by dotted line 334. In at least one embodiment, the lateral position 334 of the joint between the side sill inner panel 218 and the side sill outer panel 220 is shifted inboard by about 40 mm to accommodate a vehicle that is approximately 80 mm narrower than the wide vehicle of FIG. 2A while utilizing the same floor panel 114.

Referring collectively to FIGS. 2A through 2C, an interior trim component, such as carpeting, covers the floor panel and inner sill portion from customer view for each vehicle width. The variance in the structural components to accommodate differently-sized platform vehicles is thereby transparent to the perception of a customer. In this way, the customer does not interface with the first shelf that varies in width based on the particular vehicle. The particular dimension selected for the first shelf does not restrict the customer use of the vehicle.

According to an aspect of the present disclosure, the lateral position of the floor panel to rocker structure joining location is maintained across each of several different vehicle widths. In this way, a common floor panel and underbody components may be employed with several different vehicle widths. Package efficiency is achieved by indexing the lateral position of the door opening flange while maintaining lateral position of the floor to rocker joint. Each vehicle may have a unique body side outer panel, as well as other components which significantly affect aesthetic aspects. Moving the door opening flange outboard allows for thinner door panels and better interior package efficiency relative to the outer width of the vehicle.

While the embodiments above describe a floor panel attached to a vertical riser surface of a side sill component, it is envisioned that benefits of the present disclosure may still be preserved by attaching to other locations of a side sill component. Specifically, a floor panel may be attached to any portion of the side sill that does not index laterally between different width vehicles of a given platform. For example, the floor panel may be attached to a lower portion of the side sill where the geometry remains common across the each of the differing width vehicles.

Figure 3:
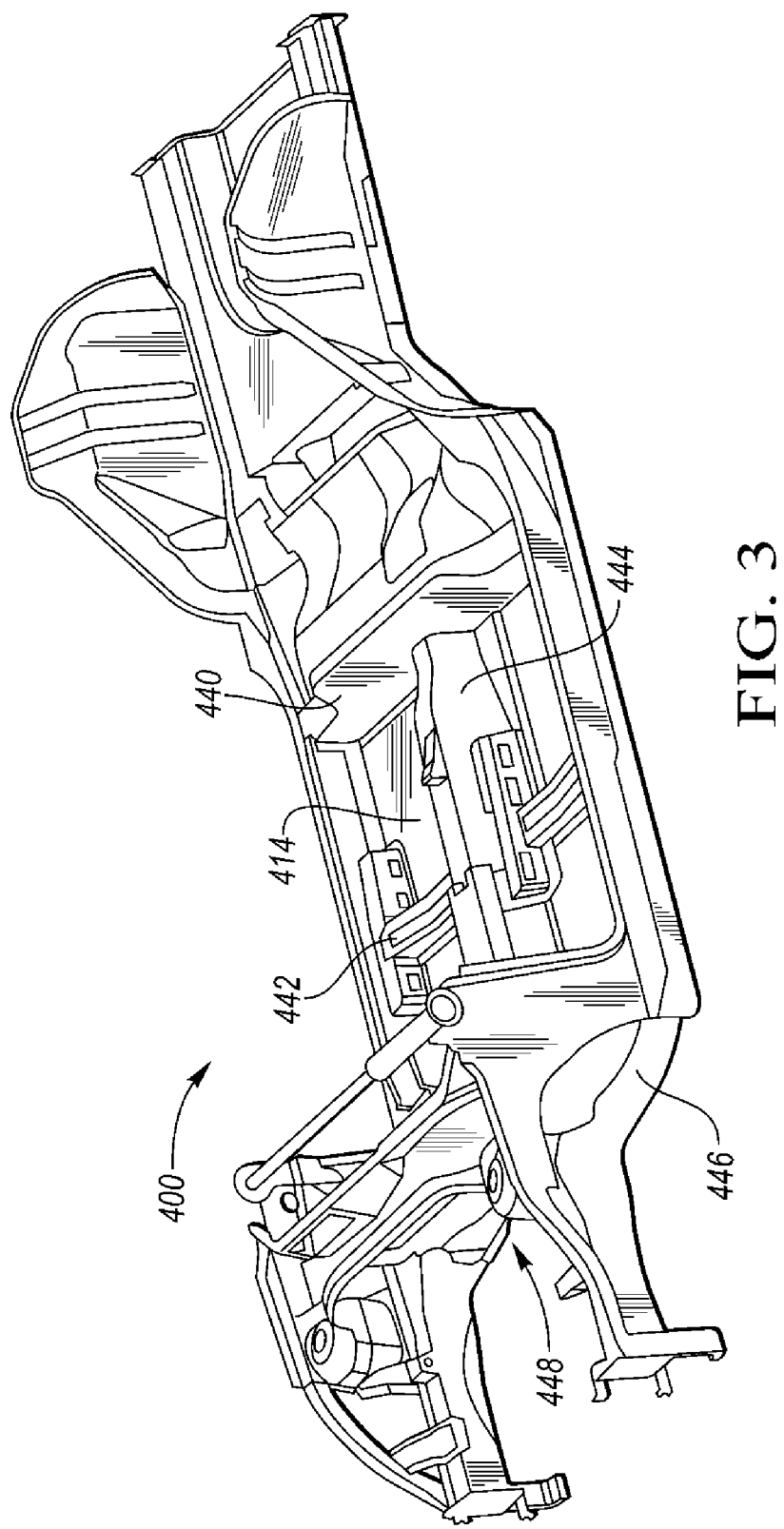
FIG. 3 is a perspective view of a lower portion of a vehicle body structure.

Referring to FIG. 3, many of the structural components comprising the lower portion of the body structure can be re-used across different vehicles according to the present disclosure. The components comprising the lower structure and front structure of the vehicle body is referred to as the "platform" of the vehicle. The present disclosure provides a structure and method for efficiently accommodating vehicles having different widths on the single vehicle platform 400. The vehicle platform 400 includes several lower components and forward components of the vehicle body structure. For example, each of a floor panel 414, a rear cross member 440, an intermediate cross member 442, a center tunnel 444, a front torque box 446, and a dash panel 448 are re-used on several different vehicles having differing widths.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A vehicle comprising:
    a floor panel spanning across a width of the vehicle;
    a sill inner panel joined to the floor panel, the sill inner panel defining
        a first riser connected to the floor panel,
        a first shelf extending from the first riser
        a second riser extending from the first shelf,
        a second shelf extending from the second riser, and
        a vertical flange extending from the second shelf; and
    a sill outer panel joined to the vertical flange and forming a closed section with the sill inner panel, wherein the first shelf is sized corresponding to the width of the vehicle and the floor panel accommodates vehicles having a different width.

2. The vehicle of claim 1 wherein the floor panel further comprises an upright flange along a lateral edge that is connected to the first riser of the sill inner panel.

3. The vehicle of claim 1 wherein a joint between the floor panel and the sill inner panel of a first vehicle having a lateral width is at the same lateral position as a second vehicle having a different lateral width.

4. The vehicle of claim 1 wherein the sill outer panel defines a door interface and the vertical flange of the sill inner panel is positioned laterally outboard corresponding to a first vehicle width.

5. The vehicle of claim 1 wherein the first shelf provides a width sizing range of up to about 80 mm between the vehicles having a different width.

6. A vehicle comprising:
    a floor spanning a vehicle width;
    a sill inner panel defining
        a first riser connected to the floor,
        a first shelf extending from the riser,
        a second shelf above the first shelf,
        a second riser extending between the first and second shelves, and
        a vertical flange extending from the second shelf; and
    a sill outer panel joined to the vertical flange; wherein
    the first shelf is sized corresponding to the vehicle width.

7. The vehicle of claim 6 wherein the sill inner panel and the sill outer panel cooperate to define a closed section.

8. The vehicle of claim 6 further comprising:
    an additional sill inner panel defining
        a third riser connected to the floor on a side opposite the first riser,
        a third shelf extending from the third riser,
        a fourth shelf above the third shelf,
        a fourth riser extending between the third and fourth shelves, and
        a vertical flange extending from the fourth shelf.

9. The vehicle of claim 8 further comprising a sill outer panel joined to the vertical flange of the additional sill inner panel.

10. A method of varying vehicle width on a single platform comprising:
    manufacturing a plurality of floor panels each having a same width defined between opposing lateral edges of the floor panel;
    manufacturing a first side sill including an inner panel having a first riser connectable to the floor panel, a first shelf extending from the first riser, a second riser extending from the first shelf, a second shelf extending from the second riser, and a vertical flange extending from the second shelf, wherein the first side sill further includes an outer panel joined to the vertical flange forming a closed section with the inner panel;
    manufacturing a second side sill including an inner panel having a first riser connectable to the floor panel, a first shelf extending from the first riser, a second riser extending from the first shelf, a second shelf extending from the second riser, and a vertical flange extending from the second shelf, wherein the second side sill further includes an outer panel joined to the vertical flange forming a closed section with the inner panel, and the first shelf of the first side sill is wider than the first shelf of the second side sill;

attaching the first side sill to one of the floor panels to produce a vehicle having a first lateral width; and attaching the second side sill to another of the floor panels to produce a vehicle having a second lateral width that is narrower than the first lateral width.

11. The method of claim 10 wherein the floor panel further comprises an upright flange at one of the lateral edges, and further comprising, joining the upright flange to one of the first risers.

12. The method of claim 10 further comprising joining a single width dash panel to one of the first side sill or the second side sill.

* * * * *